US009686456B2

(12) United States Patent
Wu

(10) Patent No.: US 9,686,456 B2
(45) Date of Patent: Jun. 20, 2017

(54) ELECTRONIC DEVICE HAVING CAMERA

(71) Applicant: ScienBiziP Consulting (Shen Zhen) Co., Ltd., Shenzhen (CN)

(72) Inventor: E-In Wu, New Taipei (TW)

(73) Assignee: ScienBiziP Consulting(Shenzhen)Co.,Ltd., Shenzhen (CN)

( * ) Notice: Subject to any disclaimer, the term of this patent is extended or adjusted under 35 U.S.C. 154(b) by 17 days.

(21) Appl. No.: 14/805,911

(22) Filed: Jul. 22, 2015

(65) Prior Publication Data

US 2016/0191760 A1 Jun. 30, 2016

(30) Foreign Application Priority Data

Dec. 29, 2014 (TW) .............................. 103146169 A

(51) Int. Cl.
*H04N 5/225* (2006.01)
*H04N 5/232* (2006.01)

(52) U.S. Cl.
CPC ......... *H04N 5/2253* (2013.01); *H04N 5/2251* (2013.01); *H04N 5/2252* (2013.01); *H04N 5/2257* (2013.01)

(58) Field of Classification Search
CPC .............. B66F 11/048; H04N 1/00307; H04N 1/32776; H04N 5/2253; H04N 5/2252; H04N 5/247; H04N 5/23216; H04N 5/2251; G03B 17/561
USPC ... 348/373, 375, 46, 222.1, 376, 47, 207.11, 348/211.99, 374
See application file for complete search history.

(56) References Cited

U.S. PATENT DOCUMENTS

| 5,801,919 | A | 9/1998 | Griencewic | |
|---|---|---|---|---|
| 6,362,851 | B1 * | 3/2002 | Lavelle | H04N 1/2112 348/220.1 |
| 2002/0137554 | A1 * | 9/2002 | Hanna | H04M 1/15 455/575.5 |
| 2007/0126924 | A1 * | 6/2007 | Shi | H04N 5/2251 348/375 |
| 2007/0206087 | A1 * | 9/2007 | Chou | H04N 7/142 348/14.01 |
| 2007/0206116 | A1 * | 9/2007 | Chou | H04N 1/00307 348/373 |

(Continued)

FOREIGN PATENT DOCUMENTS

| CN | 102957766 A | 3/2013 |
|---|---|---|
| JP | 3170782 U | 9/2011 |

(Continued)

*Primary Examiner* — Xi Wang
(74) *Attorney, Agent, or Firm* — Steven Reiss

(57) ABSTRACT

An electronic device includes a housing, a circuit board, a camera, a coupling wire, and a wire rewinding assembly. The circuit board is received in the housing. The camera is movably mounted on the housing. The coupling wire is electrically coupled to the circuit board and the camera. The wire rewinding assembly includes a driving member mounted on the housing and a wire spool rotated by the driving member. A first end of the coupling wire is electrically coupled to the camera. A second end of the coupling wire is wound on the wire spool and electrically coupled to the circuit board. When the driving member rotates the wire spool, the coupling wire can be unwound or be rewound on the wire spool.

17 Claims, 8 Drawing Sheets

(56) References Cited

U.S. PATENT DOCUMENTS

2009/0142068 A1* 6/2009 Takahashi .......... H04B 10/1149
                                                    398/140
2009/0284648 A1    11/2009 Sung et al.
2015/0364875 A1* 12/2015 Ginsberg ............... H01R 13/72
                                                    320/114

FOREIGN PATENT DOCUMENTS

TW          M340708 U    9/2008
TW         201108918 A   3/2011

* cited by examiner

ELECTRONIC DEVICE HAVING CAMERA

FIELD

The present disclosure relates to electronic devices, and particularly to an electronic device having at least one movable camera.

BACKGROUND

Electronic devices, such as mobile phones, tablet personal computers, can be used to perform a variety of tasks. The electronic device can have one or more cameras for taking photos or videos. The location of the camera can be on a front or a back side of the device.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
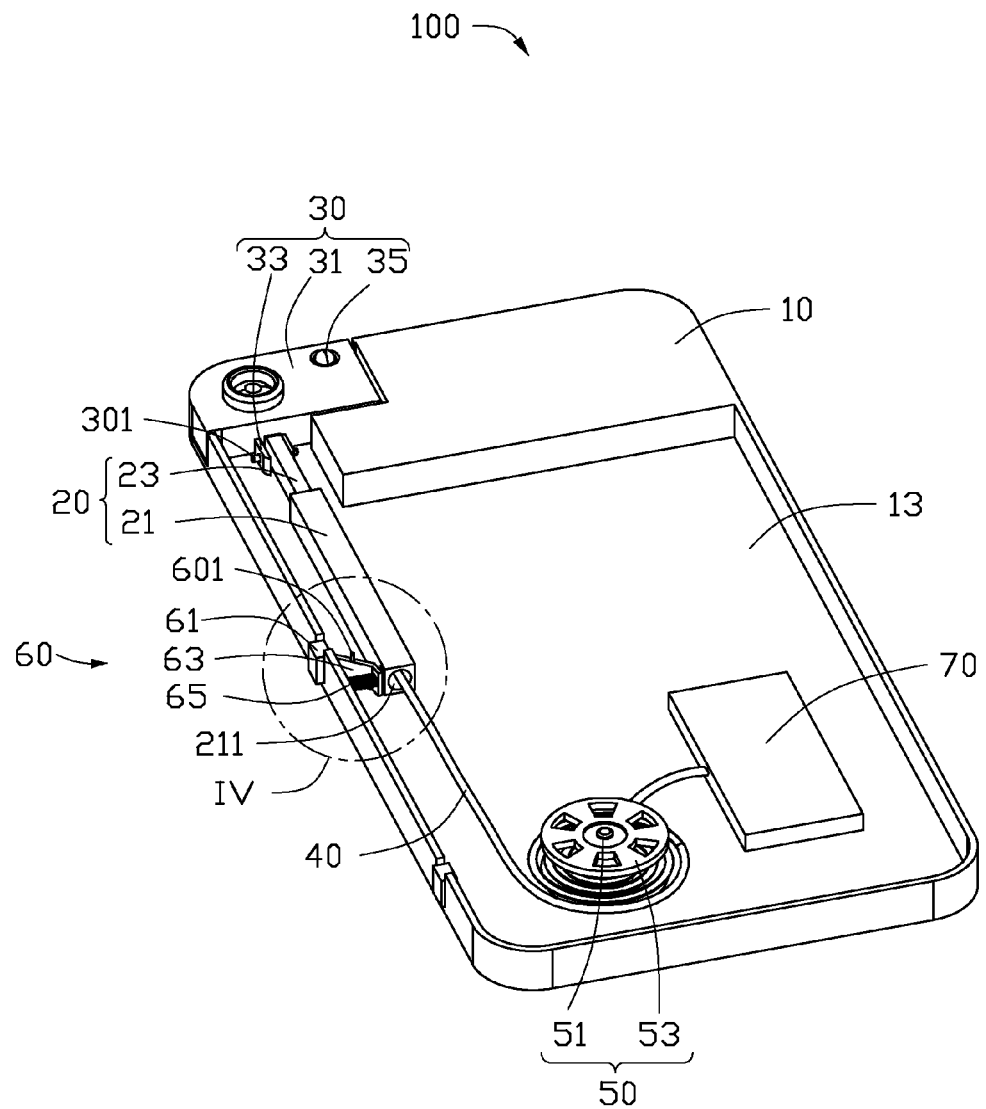
FIG. 1 is an isometric view of an electronic device, in a first configuration, according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the configurations described herein. However, it will be understood by those of ordinary skill in the art that the configurations described herein can be practiced without these specific details. In other instances, methods, procedures, and components have not been described in detail so as not to obscure the related relevant feature being described. Also, the description is not to be considered as limiting the scope of the configurations described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an electronic device which can include a housing, a circuit board, a camera, a coupling wire, and a wire rewinding assembly. The circuit board can be received in the housing. The camera can be movably mounted on the housing. The coupling wire can be electrically coupled to the circuit board and the camera. The wire rewinding assembly can include a driving member mounted on the housing and a wire spool rotated by the driving member. A first end of the coupling wire can be electrically coupled to the camera, and a second end of the coupling wire can be winded on the wire spool and electrically coupled to the circuit board. When the driving member rotates the wire spool, the coupling wire can be unwound or be rewound on the wire spool.

FIG. 1 illustrates an electronic device 100 in a first configuration. The electronic device 100 can include a housing 10, a supporting member 20, a camera 30, a coupling wire 40, a wire rewinding assembly 50, a locking assembly 60, and a circuit board 70. The supporting member 20 can be configured to support the camera 30. The camera 30 can be movably coupled to the housing 10. The circuit board 70 can be mounted within the housing 10. The coupling wire 40 can be configured to couple the camera 30 and the circuit board 70. The wire rewinding assembly 50 can be configured to rewind the coupling wire 40. The locking assembly 60 can be configured to lock the supporting member 20 on the housing 10. The coupling wire 40 can be an electric wire or a strip-shaped flexible circuit board. In the illustrated configuration, the coupling wire 40 is a wire.

Figure 2:
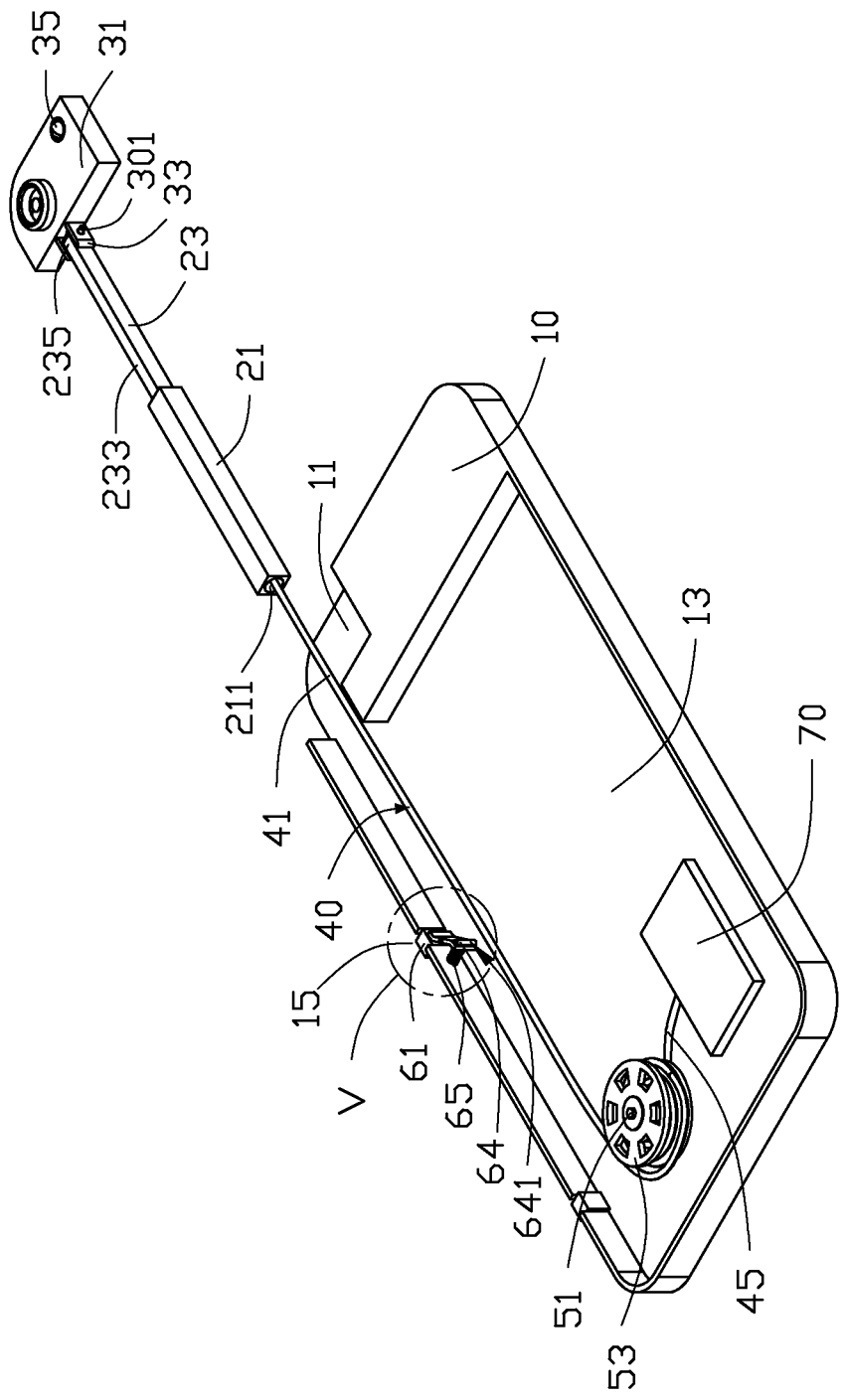
FIG. 2 is an isometric view of the electronic device of FIG. 1 in a second configuration.

FIG. 2 illustrates the electronic device 100 in a second configuration. The housing 10 can be substantially cubic. The housing 10 can define a mounting portion 11, a receiving space 13, and a latching hole 15. The mounting portion 11 and the latching hole 15 can be in communication with the receiving space 13. The mounting portion 11 can be configured for receiving the camera 30. The receiving space 13 can be positioned at a substantially center portion of the housing 10. The mounting portion 11 can be positioned at a corner of the housing 10. The latching hole 15 can be defined at a sidewall of the housing 10.

The supporting member 20 can be movably mounted within the receiving space 13 (shown in FIG. 1) and can be pulled out from the housing 10 (shown in FIG. 2). The supporting member 20 can include a supporting portion 21 and a retractable portion 23. The supporting portion 21 and the retractable portion 23 can be substantially bar-shaped. The supporting portion 21 can define a first through hole 211 (shown in FIG. 1) along a center axis thereof. The first through hole 211 can be configured to receive the coupling wire 40. A first end 233 of the retractable portion 23 can be retractably received in the first through hole 211 of the supporting portion 21. The retractable portion 23 can be manually plugged into the supporting portion 21 or manually pulled out from the supporting portion 21, to increase a total length of the supporting portion 21 and the retractable portion 23.

Figure 3:
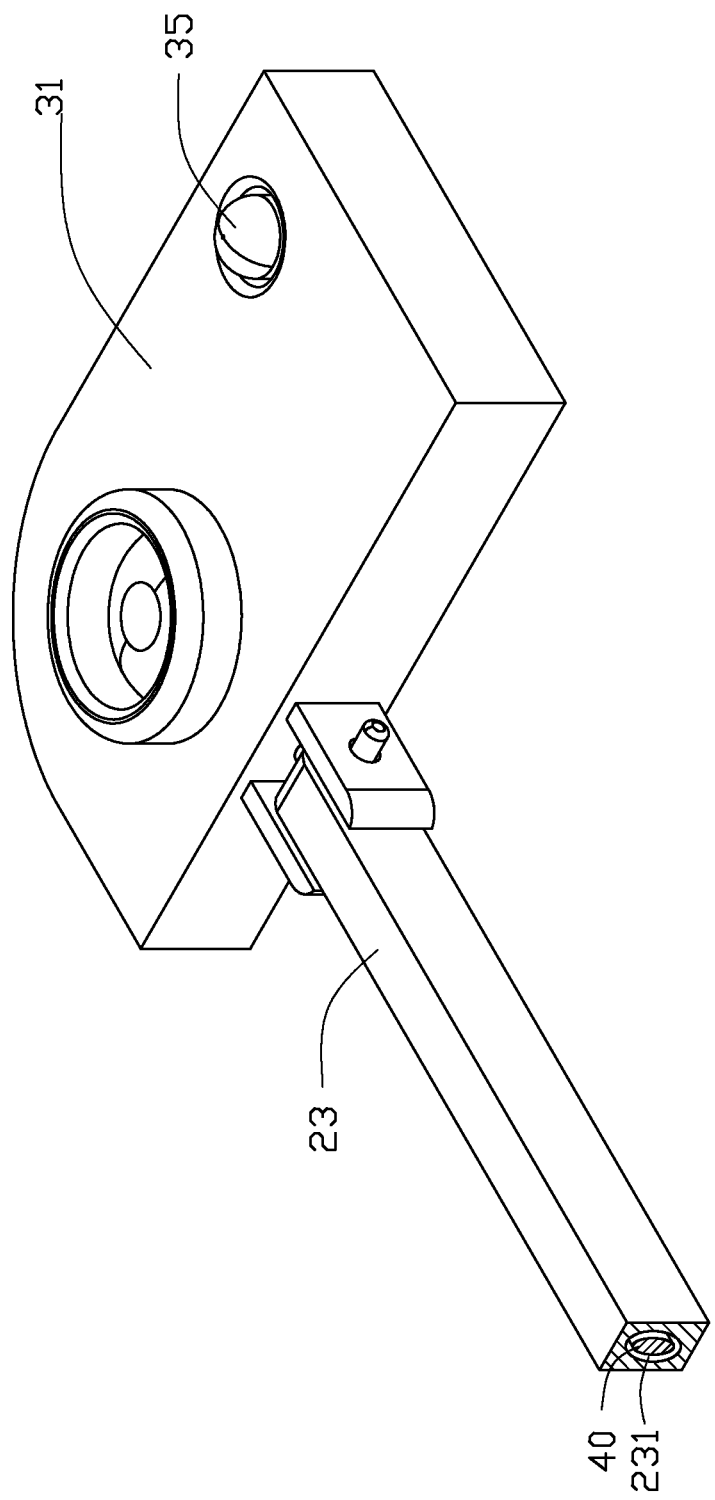
FIG. 3 is a enlarged, partial cross-sectional, isometric view of the electronic device of FIG. 2.

FIG. 3 illustrates that the retractable portion 23 can define a second through hole 231 along a center axis thereof. The second through hole 231 can be configured to receive the coupling wire 40.

Figure 4:
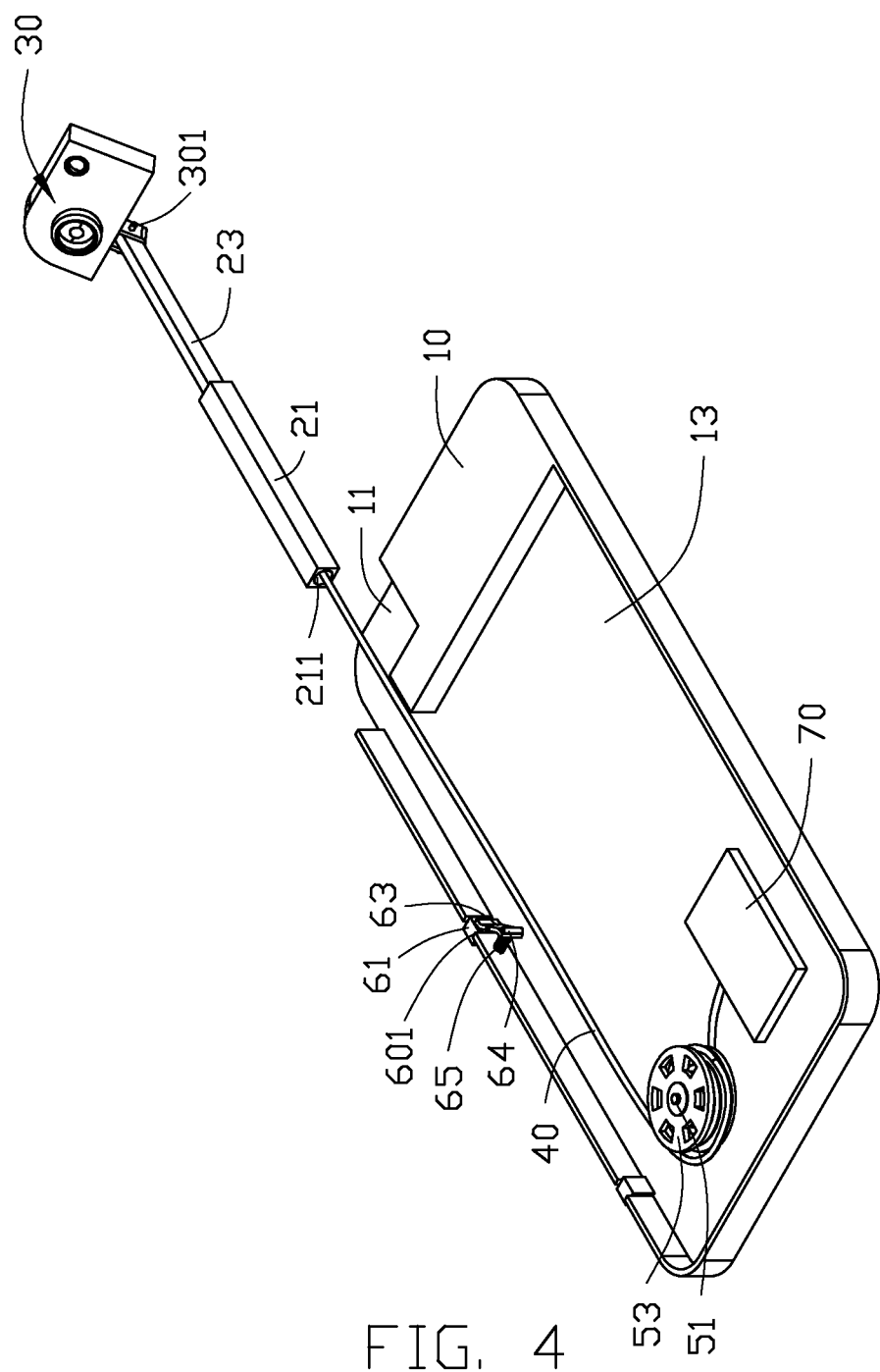
FIG. 4 is an isometric view of the electronic device of FIG. 1 in a third configuration.

FIG. 4 illustrates the electronic device in a third configuration. The camera 30 can be rotatably mounted on a second end 235 of the retractable portion 23 opposite to the first end 233 of the retractable portion 23. FIG. 1 illustrates that the camera 30 can include a camera body 31, two protruding portions 33, and a flashlight 35. The two protruding portions 33 can protrude out from an end of the camera body 31 towards the retractable portion 23. The two protruding portions 33 can be opposite to each other. The flashlight 35 can be mounted on the camera body 31. The protruding portions 33 can be pivoted to the second end of the retractable portion 23 by a pin 301. The camera 30 can rotate around the pin 301.

FIGS. 1-4 illustrate that a first end 41 of the coupling wire 40 can pass through the first through hole 211 and the second through hole 231. The first end 41 of the coupling wire 40 can be electrically coupled to the camera body 31. A second end 45 of the coupling wire 40 can be winded on the wire rewinding assembly 50. The second end 45 of the coupling wire 40 can be electrically coupled to the circuit board 70.

The wire rewinding assembly 50 can include a driving member 51 and a wire spool 53 mounted on the driving member 51. The driving member 51 can be mounted within the receiving space 13. The driving member 51 can rotate the wire spool 53 around a driving axis of the driving member 51. The second end 45 of the coupling wire 40 can be winded to the wire spool 53 and be electrically coupled to the circuit board 70. The driving member 51 can be a mini motor. The driving member 51 can be electrically coupled to the circuit board 70. A controller (not shown) coupled to the driving member 51 can control the driving member 51 to work or not. When the camera 30 needs to be detached from the housing 10, the controller can control the driving member 51 rotate the wire spool 53. The coupling wire 40 can be unwound and the camera 30 can be put on a desired position. When the camera 30 is assembled to the mounting portion 11, the controller can control the driving member 51 rotate around an opposite direction. The coupling wire 40 can be rewound to the wire spool 53. Thus, the second end 45 of the coupling wire 40 can always be coupled to the circuit board 70.

Figure 5:
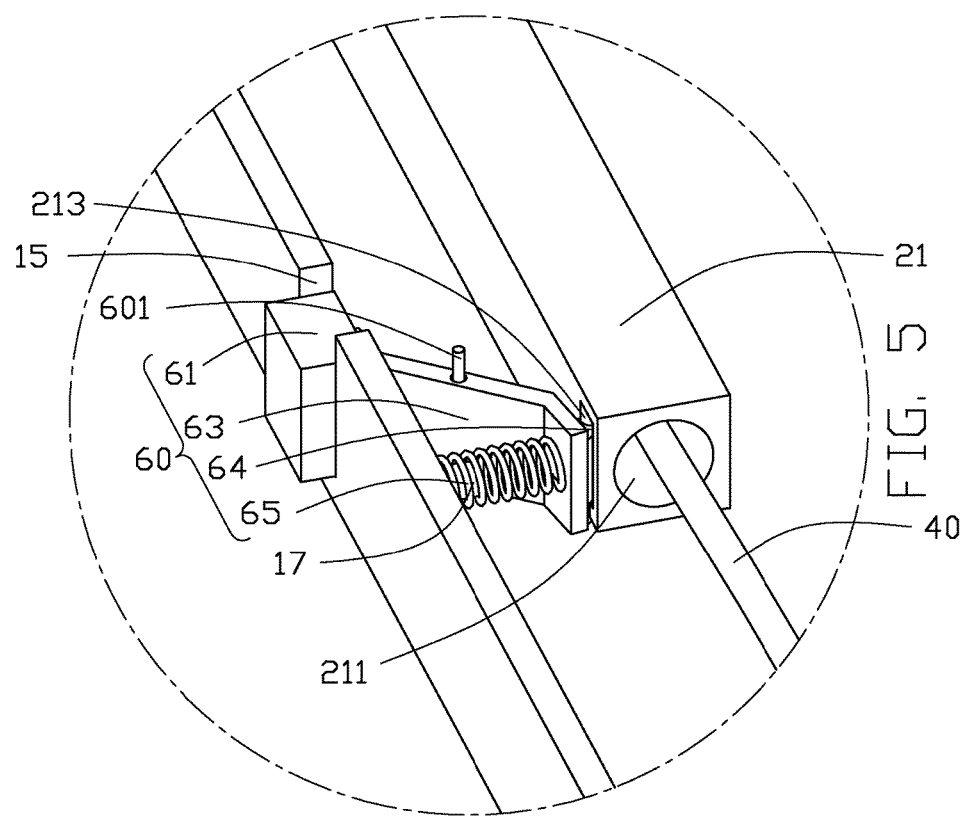
FIG. 5 is an enlarged, isometric view of a circled portion IV of FIG. 1.

FIG. 5 illustrates that a shaft 17 can be positioned at an inner surface of the sidewall. The shaft 17 can be positioned adjacent to the latching hole 15. An end of the supporting portion 21 away from the retractable portion 23 can further define a locking hole 213. The locking hole 213 can face the latching hole 15.

The locking assembly 60 can include a button 61, a coupling member 63, a locking member 64, and an elastic member 65. The button 61 can be movably mounted within the latching hole 15. The coupling member 63 can be substantially Z-shaped. The coupling member 63 can be received in the receiving space 13 and be rotatably mounted on the housing 10.

Figure 6:
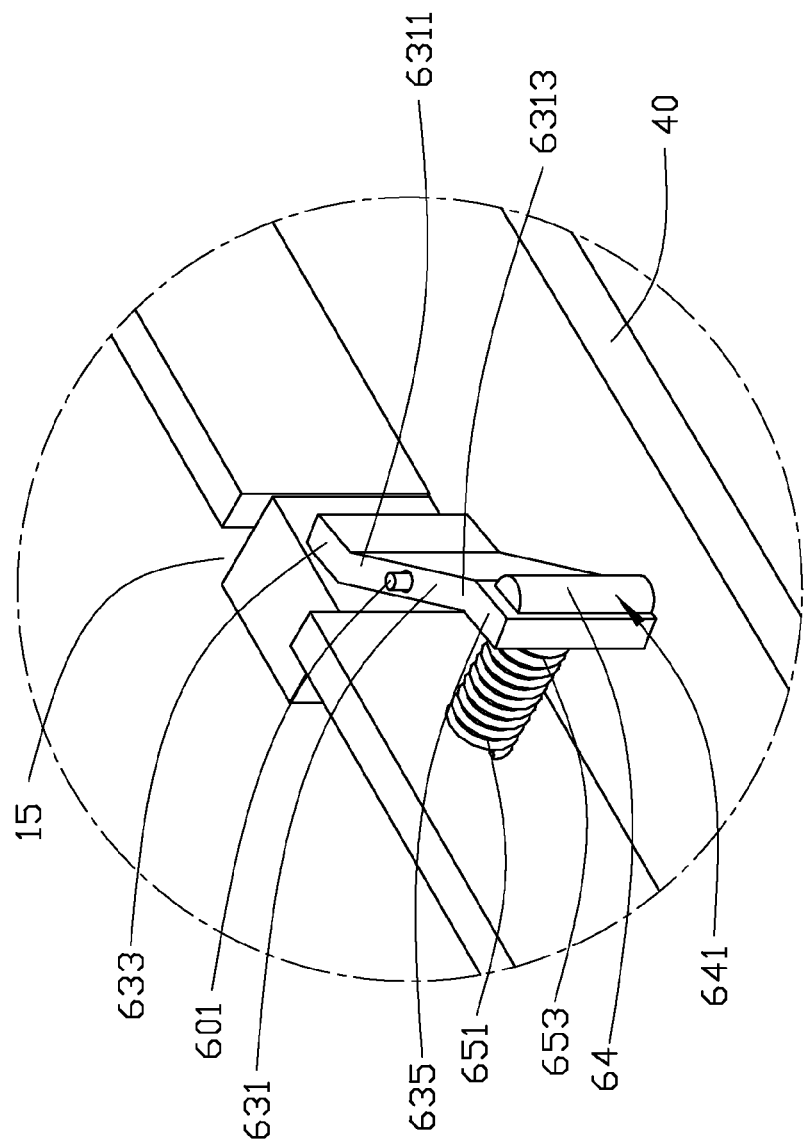
FIG. 6 is an enlarged, isometric view of a circled portion V of FIG. 2.

FIG. 6 illustrates that the coupling member 63 can include a coupling portion 631, a first fixing portion 633, and a second fixing portion 635. The first fixing portion 633 can be mounted on a first end 6311 of the coupling portion 631 and the second fixing portion 635 can be mounted on a second end 6313 of the coupling portion 631. A middle position of the coupling portion 631 can be pivoted to the housing 10 by a pin 601. The coupling portion 631 can rotate around the pin 601. The first fixing portion 633 can be coupled to the button 61. The locking member 64 can be substantially semi-cylindrical. The locking member 64 can be coupled to the second fixing portion 635.

A side of the locking member 64 away from the second fixing portion 635 can define a guiding surface 641. The guiding surface 641 can be a curved surface. The locking member 64 can be movably locked into the locking hole 213, to lock or unlock the supporting member 20 to the housing 10. When the locking member 64 being pushed out from the locking hole 213 or being inserted into the locking hole 213, the guiding surface 641 of the locking member 64 can move along an edge of the locking hole 213. The elastic member 65 can be sleeved on the shaft 17. A first end 651 of the elastic member 65 can abut against an inside wall of the housing 10 and a second end 653 of the elastic member 65 opposite to the first end 651 can abut against a side of the second fixing portion 635 away from the locking member 64.

When assembled, the coupling member 63 and the elastic member 65 can be mounted within the receiving space 13. Two ends of the elastic member 65 can abut against the housing 10 and the coupling member 63. The button 61 can be movably mounted within the latching hole 15 and the button 61 can be coupled to the coupling member 63. The first end 41 of the coupling wire 40 can pass through the first through hole 211 and the second through hole. The first end 41 of the coupling wire 40 can be electrically coupled to the camera 30. The second end 45 of the coupling wire 40 can be winded on the wire spool 53 and the second end 45 of the coupling wire 40 can be electrically coupled to the circuit board 70. The locking member 64 can be locked into the locking hole 213 of the supporting portion 21.

When the button 61 is pressed, the coupling portion 631 can rotate around the pin 601. The second fixing portion 635 of the coupling member 63 can compress the elastic member 65. The locking member 64 mounted on the second fixing portion 635 can be pushed out from the locking hole 213. The controller can control the driving member 51 rotate the wire spool 53 to release the coupling wire 40. The supporting member 20 and the camera 30 can be taken out from the housing 10. When a length of the supporting member 20 is insufficient, the retractable portion 23 can be taken out from the supporting portion 21 to increase the length of the supporting member 20. After taking photos, the retractable portion 23 can be manually put into the supporting portion 21. Pressing the button 61 can cause the coupling portion 631 of the coupling member 63 to rotate around the pin 601, and the second fixing portion 635 of the coupling member 63 can compress the elastic member 65. The supporting member 20 can be pushed into the receiving space 13 and the camera 30 can be mounted on the supporting portion 11. Releasing the button 61, an elastic force of the elastic member 63 can push the coupling portion 631 of the coupling member 63 to rotate around the pin 601 and to cause the second fixing portion 635 mounted on the locking member 64 be locked into the locking hole 213. The controller can control the driving member 51 driving the wire spool 53 rotate and to cause the coupling wire 40 be rewound on the wire spool 53.

Figure 7:
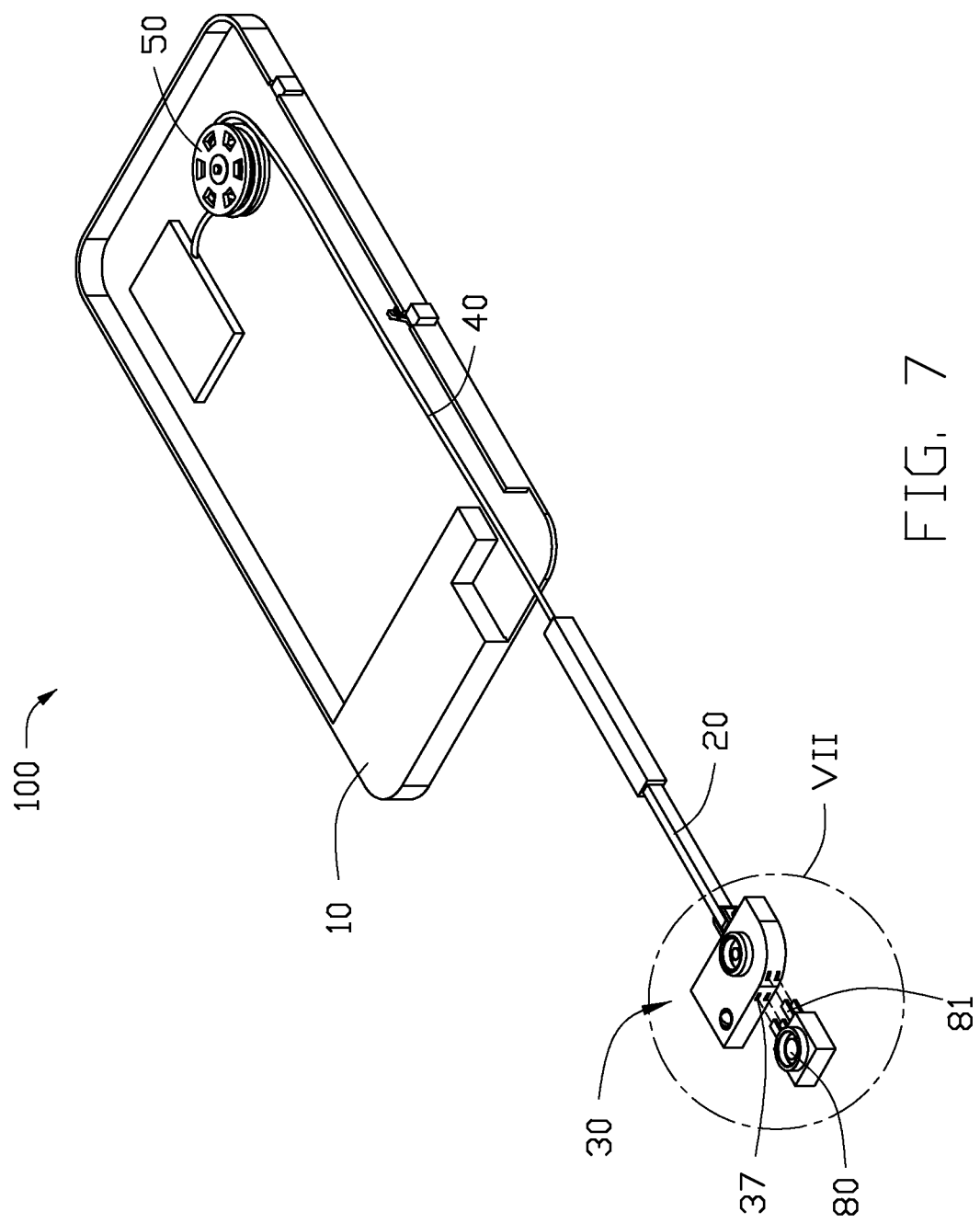
FIG. 7 is an isometric view of an electronic device, in a fourth configuration, according to the present disclosure.
Figure 8:
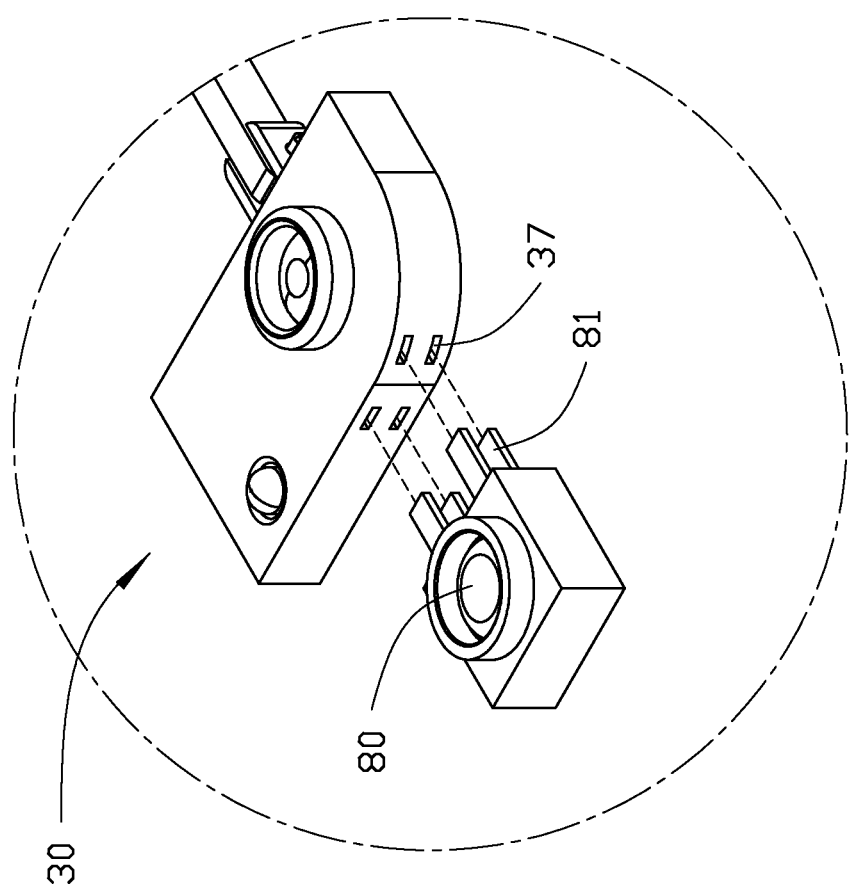
FIG. 8 is an enlarged, isometric view of a circled portion VII of FIG. 7.

FIGS. 7 and 8 illustrate an electronic device in a fourth configuration which is similar to the electronic device 100 in the first configuration. A difference between the electronic device 100 of the first configuration and the electronic device 100 of the fourth configuration are illustrated as follows. The electronic device 100 of the fourth configuration can further include another camera 80. The camera 80 can define a plurality of electrical plugs 81. An end of the camera body 31 away from the supporting member 20 can define a plurality of electrical interfaces 37. The plurality of the electrical interfaces 37 can be configured to be detachably coupled to the plurality of electrical plugs 81. When the electrical plugs 80 are plugged into the electrical interfaces 37, the camera 80 can be electrically coupled to the circuit board 70 by the electrical plugs 80 and the electrical interfaces 37, to cause the camera 80 being a part of the electronic device 100. A number of the electrical interface 37 and the electrical plug 80 can be one or more than one.

In at least one configuration, the supporting member 20 and the locking assembly 60 can be omitted when the supporting portion 11 defines a groove cooperative to the protruding portion 33 to cause the camera 30 movably mounted on the housing 10.

In at least one configuration, the locking hole 213 of the supporting portion 21 can be omitted when the supporting portion 21 defines an embossment instead of the locking hole 213 and the locking member 64 defines a locking hole cooperative to the embossment.

In at least one configuration, a number of the retractable portion 23 can be one or more than one, when the number of the retractable portion 23 is more than one, the retractable portion 23 can be retractably mounted on the supporting portion 21 in turn.

In at least one configuration, the elastic member 65 can be omitted and the coupling member 63 can't be rotatably mounted on the housing 10 by the pin 601. When the locking hole 213 is a stepped hole, the locking member 64 can be elastic. When the camera 30 needs to be disassembled from the housing 10, pulling the button 61 can cause the locking member 64 being pushed out from the locking hole 213, thus the supporting member 20 can extend out from the housing 10. When the supporting member 20 needs to be mounted on the housing 10, pressing the button 61 can cause the locking member 64 be locked into the locking hole 213.

In at least one configuration, the coupling member 63 can be omitted when the locking member 64 is mounted on the button 61 and an end of the locking member 64 away from the button 61 is elastic.

The configurations shown and described above are only examples. Many details are often found in the art such as the other features of an electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the configurations described above may be modified within the scope of the claims.

What is claimed is:

1. An electronic device comprising:
    a housing;
    a circuit board received in the housing;
    a camera movably coupled to the housing;
    a coupling wire having a first end and a second end, the first end being electrically coupled to the camera, and the second end being electrically coupled to the circuit board;
    a wire rewinding assembly comprising:
        a driving member mounted on the housing, and
        a wire spool coupled to the driving member, wherein the wire spool is configured to be rotated by the driving member, and wherein the wire spool is configured to have the coupling wire wound around; and
    a locking assembly comprising:
        a button; wherein a latching hole is defined on the housing, and the button is movably received in the latching hole;
        a locking member coupled to the button; and
        a coupling member rotatably mounted on the housing by a pin, the coupling member comprising:
            a coupling portion rotatably mounted on the housing;
            a first fixing portion coupled to the coupling portion and the button; and
            a second fixing portion coupled to the coupling portion and the locking member;
    wherein when the driving member rotates the wire spool, the coupling wire can be unwound or rewound on the wire spool.

2. The electronic device of claim 1,
    wherein the electronic device further comprises a supporting member movably coupled to the housing;
    wherein the camera is rotatably coupled to the supporting member, the coupling wire passes through the supporting member, and a locking hole is defined in the supporting member; and
    wherein the locking member is movably locked to the locking hole.

3. The electronic device of claim 2,
    wherein the locking assembly further comprises an elastic member abut against the housing and the coupling member; and
    wherein two ends of the coupling member are coupled to the button and the locking member.

4. The electronic device of claim 3, wherein a side of the locking member away from the coupling member defines a guiding surface.

5. The electronic device of claim 3, wherein the elastic member is sleeved on a shaft coupled to the housing.

6. The electronic device of claim 5, wherein the supporting member comprises:
    a supporting portion, wherein a first through hole is defined in the supporting portion; and
    a retractable portion retractably coupled to the supporting portion, wherein a second through hole is defined in the retractable portion.

7. The electronic device of claim 2, wherein the camera comprises:
    a camera body,
    a protruding portion protruded out from the camera body, and
    a flashlight mounted on the camera body,
    wherein the protruding portion is pivoted to the supporting member by a pin.

8. The electronic device of claim 2, wherein a plurality of electrical interfaces are defined on an end of the camera away from the supporting member.

9. The electronic device of claim 2, wherein at least one electrical interface is defined on an end of the camera away from the supporting member, the electronic device further comprises another camera comprising at least one electrical plug, the at least one electrical plug can be detachably plugged into the at least one electrical interface.

10. An electronic device comprising:
    a housing;
    a circuit board received in the housing;
    two cameras detachably coupled to each other;
    a coupling wire having a first end and a second end, the first end being electrically coupled to one of the cameras, and the second end being electrically coupled to the circuit board;

a wire rewinding assembly comprising:
  a driving member mounted on the housing, and
  a wire spool rotated by the driving member and being configured to have the coupling wire wound around; and
a locking assembly comprising:
  a button; wherein a latching hole is defined on the housing, and the button is movably received in the latching hole;
  a locking member coupled to the button; and
  a coupling member rotatably mounted on the housing by a pin, the coupling member comprising:
    a coupling portion rotatably mounted on the housing;
    a first fixing portion coupled to the coupling portion and the button; and
    a second fixing portion coupled to the coupling portion and the locking member.

11. The electronic device of claim 10,
wherein the electronic device further comprises a supporting member movably coupled to the housing;
wherein the camera coupled to the coupling wire is rotatably coupled to the supporting member, the coupling wire passes through the supporting member, and a locking hole is defined in the supporting member; and
wherein the locking member is detachably locked to the locking hole.

12. The electronic device of claim 11,
wherein the locking assembly further comprises an elastic member abut against the housing and the coupling member; and
wherein two ends of the coupling member are coupled to the button and the locking member.

13. The electronic device of claim 12, wherein the locking member defines a guiding surface.

14. The electronic device of claim 12, wherein the elastic member is sleeved on a shaft coupled to the housing.

15. The electronic device of claim 14, wherein the supporting member comprises:
  a supporting portion, wherein a first through hole is defined in the supporting portion; and
  a retractable portions retractably coupled to the supporting portion, wherein a second through hole is defined in the retractable portion.

16. The electronic device of claim 11, wherein the camera coupled to the coupling wire comprises:
  a camera body,
  a protruding portion protruded out from the camera body, and
  a flashlight mounted on the camera body,
  wherein the protruding portion is pivoted to the supporting member by a pin.

17. The electronic device of claim 10, wherein at least one electrical interface is defined on the camera coupled to the coupling wire, the another camera comprises at least one electrical plug, the at least one electrical plug can be detachably plugged into the at least one electrical interface.

* * * * *